June 22, 1971  D. M. MacMILLAN ETAL  3,585,679
MOLD LOADER
Original Filed April 11, 1963  2 Sheets-Sheet 2
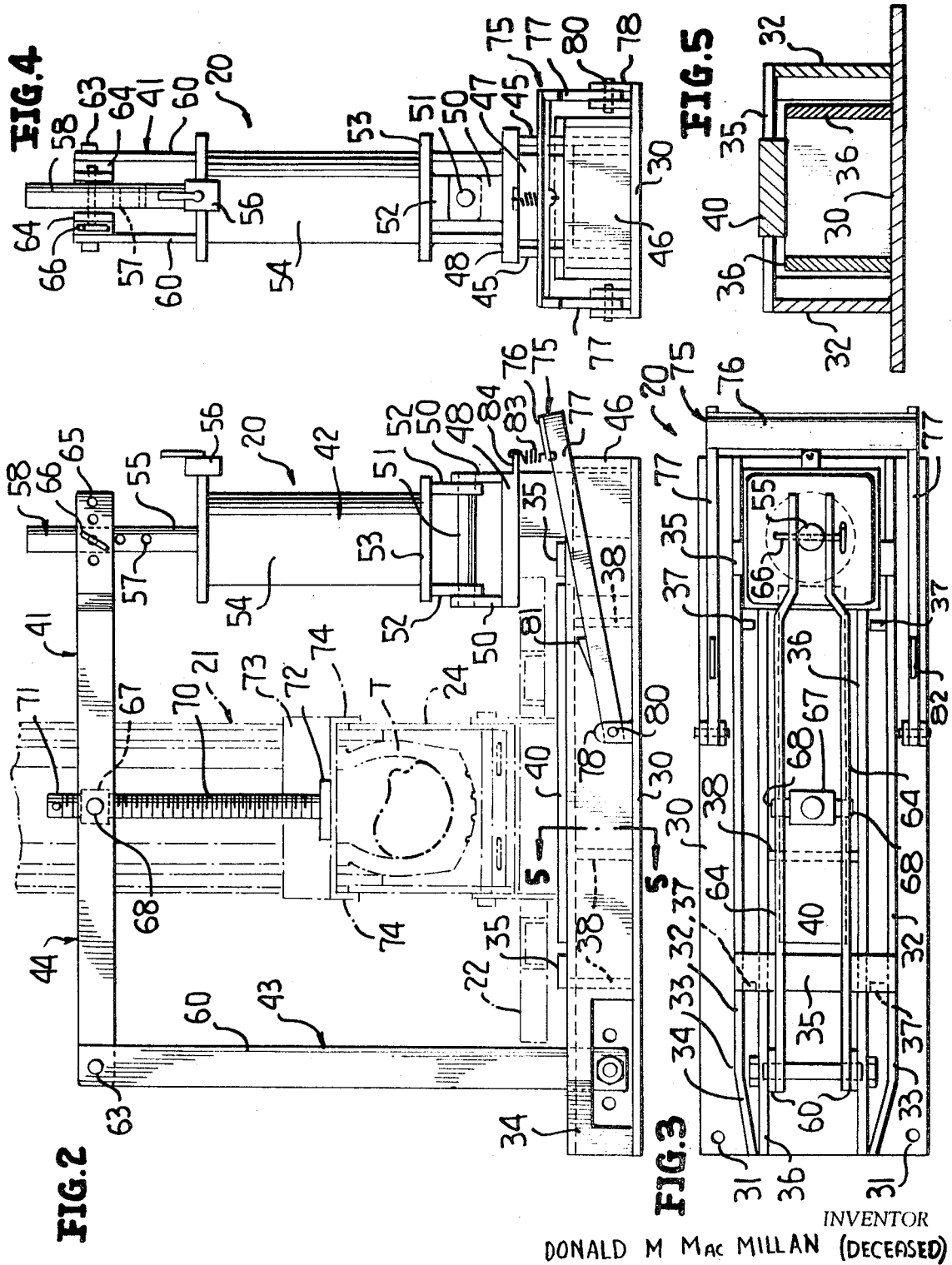
INVENTOR
DONALD M MacMILLAN (DECEASED)
BY KENNETH T. MacMILLAN (TRUSTEE)
BY
Mason, Porter, Diller & Brown
ATTORNEYS United States Patent Office 3,585,679
Patented June 22, 1971

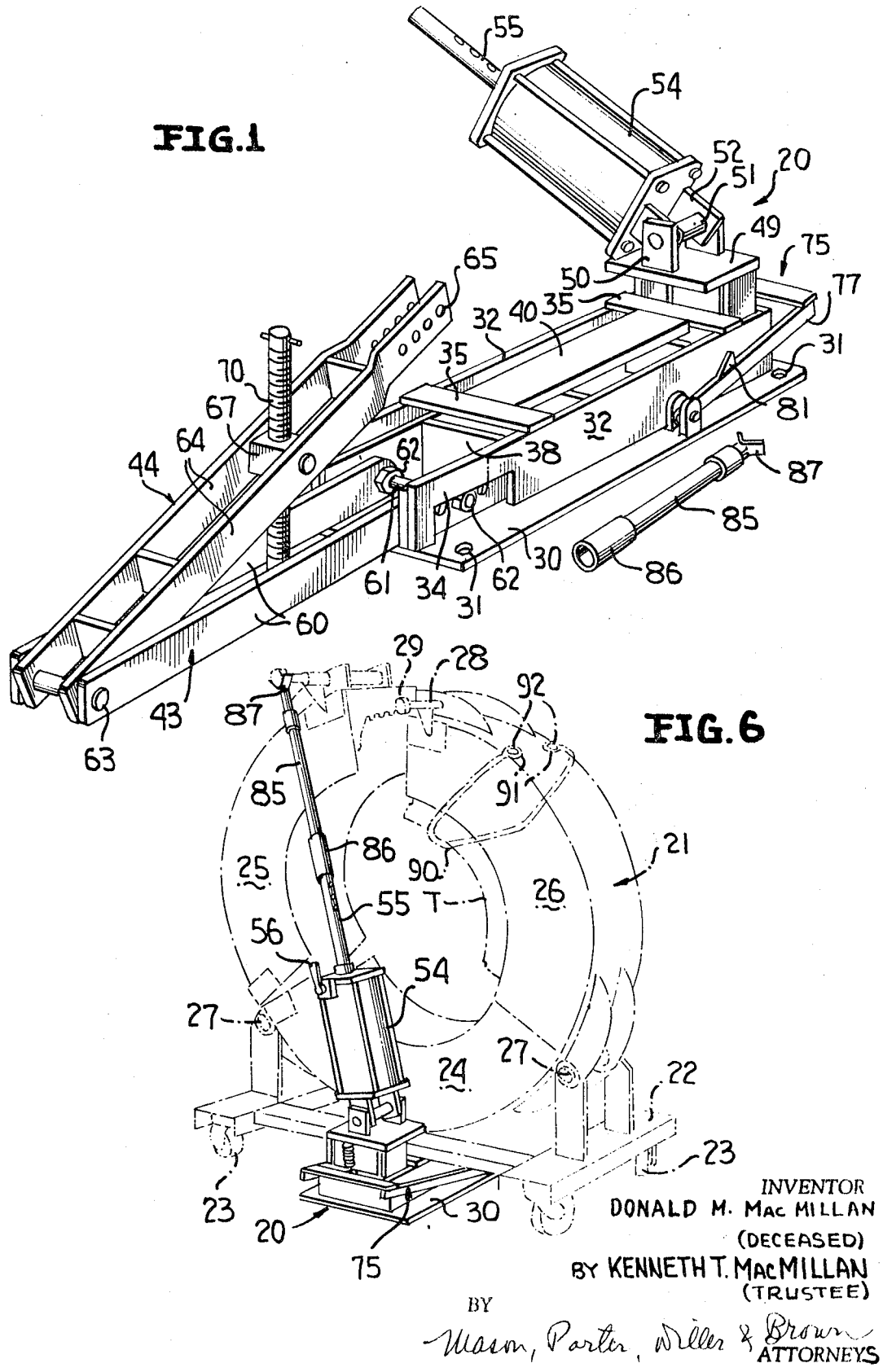

3,585,679
MOLD LOADER
Donald M. MacMillan, deceased, late of Macon, Ga., by Kenneth T. MacMillan, trustee, Macon, Ga., assignor to MacMillan Mold Co., Inc., Macon, Ga.
Original application Apr. 11, 1963, Ser. No. 272,376, now Patent No. 3,429,005. Divided and this application Dec. 20, 1968, Ser. No. 785,815
Int. Cl. B29h 5/04
U.S. Cl. 18—2TT                 20 Claims

ABSTRACT OF THE DISCLOSURE

This disclosure relates to a mold loader having a base adapted to be positioned beneath a generally oval-shaped tire mold, a pair of arms pivotally joined to the base, and a third arm connected therebetween and spanning through an opening of the tire mold, the third arm carries a force-applying member in the form of a screw, and one of the pair of arms is retractable to decrease the distance between the screw and a tire within the mold to set the same therein.

This application is a divisional of my co-pending application Ser. No. 272,376, filed Apr. 11, 1963, and now Pat. No. 3,429,005.

A primary object of this invention is to provide a novel mold loader which includes a base adapted to be positioned beneath a generally annular-shaped tire mold, means carried by the base for suspendingly supporting a force-applying member in overlying spaced relationship to the base and within the opening of the tire mold, and means for forcefully moving the force-applying member toward the base to set a tire within an underlying portion of the mold.

A further object of this invention is to provide a novel mold loader of the type defined wherein means are provided apart from the moving means for selectively adjusting the distance of the force-applying member from the base, pivot means for pivotally securing the force-applying member to the supporting means, guide means carried by the base for slidingly engaging against guide surfaces of the mold for accurately positioning the base therebeneath, and latching means carried by the base for latchingly securing the base in underlying relationship to the tire mold.

Yet another object of this invention is to provide a novel mold loader of the type described wherein the supporting means include a first arm, a second arm and a third arm connected between the first and second arms, the force-applying member being carried by the third arm, and one of the first and second arms is a fluid motor defining the moving means for drawing the force-applying member toward an underlying portion of the tire mold.

Still another object of this invention is to provide a novel mold loader of the type described wherein the adjusting means between the third arm and the force-applying member is a screw-threaded connection therebetween, and the guide means are defined by a pair of generally outwardly converging guide rails of the base.

With the above and other objects in view that will hereinafter appear, the nature of the invention will be more clearly understood by reference to the following detailed description, the appended claimed subject matter, and the several views illustrated in the accompanying drawings.

In the drawings:

FIG. 1 is a perspective view of a mold loader of this invention, and illustrates a base carrying latching means and guide rails, first and second arms pivotally connected thereto, and a third arm which is adapted to be connected between the first and second arms within the opening of an oval-shaped tier mold with which the loader is associated.

FIG. 2 is a side elevational view of the mold loader of FIG. 1, and illustrates the same in its operative position with the base in underlying relationship to the tire mold and a screw-threaded force-applying member suspendingly supported by the third arm.

FIG. 3 is a top plan view of the mold loader of FIG. 2, and illustrates a pair of guide rails for accurately introducing the base of the loader beneath the tire mold.

FIG. 4 is an end view in side elevation looking from right-to-left in FIG. 2, and more clearly illustrates the details of one of the upstanding arms which is a fluid motor.

FIG. 5 is an enlarged sectional view taken generally along line 5—5 of FIG. 2, and illustrates a reinforced pressure pad located in generally underlying relationship to the force-applying member.

FIG. 6 is a perspective view of the mold loader of FIGS. 1 through 4, and illustrates the manner in which a removable push rod is secured to a reciprocal piston rod of the fluid motor to break away a section of the tire mold after a curing operation.

A mold loader constructed in accordance with this invention is fully illustrated in FIGS. 1 through 4 of the drawings, and is generally designated by the reference numeral 20. A mold 21 associated with the loader 20 is fully described in the latter-noted disclosure, and in general includes a base 22 (FIG. 6) which may be elevated by stationary feet or provided with wheels 23. The mold 21 includes three mold or matrix sections 24, 25 and 26, the latter two of which are pivotally mounted to the base 22 by means of pivot pins 27. Axially outwardly directed pins 28 having enlarged heads 29 are carried by the matrix sections 25, 26 for a reason to be described more fully hereinafter. In addition, the underside of the base 22 is provided with a plurality of guide rollers (not shown) for cooperating with the loader 20 to center the same during closing and opening operations, as more fully described in the latter-noted disclosure.

The loader includes a base plate 30 which is of a substantially rectangular configuration. The base plate 30 is provided with a plurality of identical apertures 31 through which a plurality of bolts (not shown) are insertable for securing the base plate 30 to a supporting surface if desired. A pair of elongated guide rails 32 each having a guide surface 33 are welded to the base plate 30 of the loader 20. End portions 34 of the guide rails 32 converge toward each other to facilitate the guiding alignment of the frame 22 of the mold 21 with respect to the loader 20 in a manner fully described in the latter-noted disclosure. A pair of identical guide rail braces 35 are secured between and atop the guide rails 32. A pair of back jack connecting arms 36 rest upon the base plate 30 between the guide rails 32. The back jack connecting arms 36 are freely movable with respect to the base plate 30 and any movement thereof transverse of the base plate 30 is limited by a plurality of identical back jack connecting arm guides 37 secured to each of the guide rails 32. The back jack connecting arms 36 are secured together by a pair of back jack connecting arm braces 38. A substantially elongated rectangular floating pad 40 is welded atop the back jack connecting arm braces 38 of the back jack connecting arms 36. The longitudinal movement of the back jack connecting arms 36 with respect to the base plate 30 is limited by the abutment of the floating pad 40 with the respective guide rail braces 35 between the guide rails 32. The upward movement of the back jack connecting arms 36 is also limited by the guide rail braces 35. That is, the movement of the back jack connecting arm 36 is limited by the abutment of an uppermost edge thereof with the underside of each of the guide rail braces 35.

The loader 20 includes means 41 for spanning the immovable central matrix section 24 of mold 21 in the manner best illustrated in FIG. 2 of the drawings. The spanning means 41 includes a first arm or member 42, a second arm or member 43, and a third arm or member 44 connected between the respective first and second arms 42 and 43. The first arm 42 includes a pair of upstanding platform braces 45, each of the platform braces 45 being welded or otherwise secured to a respective one of the back jack connecting arms 36 adjacent an end plate 46 secured between the guide rails 32. Another upstanding platform brace 47 is secured to the back jack connecting arms 36 adjacent the end plate 46. The platform braces 45 and 47 cooperate to form a substantially U-shaped upstanding brace atop which is secured a substantially square platform 48. A pair of hinge plates 50 are secured to the platform 48 and are journalled by a pin 51 to a pair of hinge plates 52 depending from a bottom plate 53 of an air cylinder 54. The air cylinder 54 includes a reciprocal piston rod 55, the direction of movement of which can be changed by an air valve 56 carried by the air cylinder 54 in a manner well known in the art. A plurality of adjusting apertures 57 are formed in an upper end portion 58 of the piston rod 55.

The second member 43 includes a second pair of connecting arms 60 journalled between the back jack connecting arms 36 by a connecting arm pin 61. The connecting arm pin 61 is threaded at the terminal portions thereof and a pair of nuts 62 secure the connecting second arms 60 with respect to the back jack connecting arms 36. A second connecting arm pin 63 secures the second member 43 to the third member 44.

The third member 44 of the spanning means 41 includes a pair of spaced air cylinder connecting arms 64 journalled at one end thereof by the second connecting arm pin 63 to the second member 43, and at an opposite end thereof, the air cylinder connecting arms 64 are each provided with a plurality of alignment apertures 65. A removable connecting arm locking pin 66 is passed through a selected one of each of the plurality of alignment apertures 57 and 65. A loading screw swivel 67 is journalled between the air cylinder connecting arms 64 by a pair of identical integral swivel pins 68. A force-applying member or loading screw 70 has an upper end portion 71 threadably received in the loading screw swivel 67, and a lower end terminates in an enlarged head 72. The headed end portion 72 of the loading screw 70 bears against an arcuate bead plate 73 provided with a pair of depending flanges 74 which are spaced apart a distance slightly greater than the width of the central matrix section 24 of the mold 21 for a purpose to be described more fully hereinafter.

A substantially U-shaped latching or locking arm 75 having a foot pedal portion 76 and a pair of spaced parallel locking arms 77 is pivotally attached to the base plate 30 by a pair of locking arm hinge plates 78 and an associated locking hinge pin 80. One of the locking arms 77 includes a lock member 81 having a camming surface 82. The locking or latch member 81 cooperates with channel bars (not shown) of the mold base 22 to lock the loader 20 relative to the mold 21 in the manner set forth in the latter-noted disclosure. Biasing means in the form of a spring 83 is connected between the foot pedal portion 76 and a spring tab 84 of the air cylinder platform 48.

As was heretofore noted, the sectional mold 21 is particularly adapted for retreading tires and the loader 20 is used to urge a built-up tire into the central matrix section 24, and also to remove the subsequently cured tire from the mold.

The movable matrix sections 25, 26 must be first opened to a fully open position (not shown) by swinging the same about the hinge pins 27. Prior to opening the matrix sections 25, 26 or after the sections have been opened, the mold 21 is rolled on the loader 20 which is preferably secured to a supporting surface. As the mold 21 is rolled on the loader 20, guide rollers (not shown) beneath the base 22 of the mold 21 first contact the converging end portions 34 of the guide rails 32 at the guiding surfaces 33. As relative movement continues the guide rails 32 thus accurately position the loader 21 with respect to the central matrix section 24, as shown in FIG. 2.

A tire T (FIG. 2) with camel back is then inserted to the central matrix section 24. The arcuate bead plate 73 is then positioned atop the beads (unnumbered) of the tire T in overlying relationship to the central matrix section 24, as is best illustrated in FIG. 2 of the drawings. The second pair of connecting arms 60 and the air cylinder connecting arms 64 are moved from the position shown in FIG. 1 to the position illustrated in FIG. 2 at which time the piston rod 55 is reciprocated by manipulating the air valve 56 of the air cylinder 54 to align one of the apertures 57 of the piston rod 55 with an aperture 65 in the air cylinder connecting arms 64. The air cylinder connecting arm locking pin 66 is then inserted through these aligned apertures, as shown in FIG. 2.

The loading screw 70 is then rotated until the enlarged head 72 thereof contacts the bead plate 73 positioned atop the beads of the tire T in the central matrix section 24. At this point a matrix pad (unnumbered) secured to the bottom of the central matrix section 24 is spaced a slight distance away from the floating pad 40 secured atop the back jack connecting arm braces 38 of the back jack connecting arms 36. The mold and loader are then locked together by means of the latch 81 of the latch arm 77 which automatically occurs as the mold 21 is rolled upon the loader 20.

The air valve 56 is then actuated to draw the piston 55 into the air cylinder 54. This motion of the piston rod 55 first brings the pad 40 into contact with the pad (unnumbered) of the central matrix section 24 by drawing the back jack connecting arms 36 and the matrix pad 40 secured thereto upwardly. In effect, the back jack connecting arm 36 and the matrix pad 40 "float" upwardly until the latter abuts the undersurface of the pad carried by the central matrix section 24 at which time the back jack connecting arms 36 are in spaced relationship along the entire length thereof to the base plate 30. Continued inward movement of the piston rod 55 with respect to the air cylinder 54 causes downward movement of the loading screw 70 to set or urge the tire T into the central matrix section 24. During the application of this force none of the force is applied to the mold 21, but rather, the force is applied directly to the central matrix section 24 because of the "floating" motion of the pad 40 with respect to the matrix pad of the central matrix section 24. The entire force imparted by the air cylinder 54 is applied directly between the pad 40 of the loader 20 and the enlarged head 72 of the loading screw 70, thereby urging the bead plate 73 downwardly, as viewed in FIG. 2, until the same contacts edges (unnumbered) of the central matrix section 24. At this position the tire T is fully set within the central matrix section 24 of the mold 21.

The movable matrix sections 25, 26 are then pivoted closed by a sweeping motion and are locked in their closed position. Once the sections 24–26 have been locked the air valve 56 of the air cylinder 54 is manipulated to reciprocate the piston rod 55 outwardly of the air cylinder 54, thus releasing the force previously applied to the tire T through the loading screw 70. The air cylinder connecting arm locking pin 66 is removed and the second and third arms 43, 44, respectively, of the spanning means 41 are folded to the position shown in FIG. 1 or more fully unfolded with both arms 43, 44 in alignment with the motor base in order that the mold 21 can be removed therefrom. The air cylinder 54 is also pivoted about the hinge pin 51 to an out-of-the-way position. The latch 81 is released by stepping on the foot pedal portion 76 and the mold 21 is rolled off the loader 20. Thereafter the mold 21 is rolled to a curing station, the mold is heated, and the tire T is cured at a predetermined time and temperature.

After the tire T is cured the mold 21 is again rolled back over the loader 20 and the locking mechanism (not shown) is unlocked to release the movable matrix sections 25, 26. Because the cured tire adheres to the matrix sections 24–26, the opening of the matrix sections 25, 26 by a pivoting motion is an extremely difficult operation and is virtually incapable of being performed manually. Therefore, an adjustable push rod 85 having a sleeve 86 at one end and a bifurcated portion 87 at another end thereof is attached to the piston rod 55 of the air cylinder 54, as is illustrated in FIG. 6 of the drawings. The bifurcated portion 87 of the push rod 85 is placed in underlying abutment with either of the opening pins 28, and is illustrated first in contact with the opening pin of the movable matrix section 25. The air valve 56 of the air cylinder 54 is manipulated to reciprocate the piston rod 55 and the push rod 85 attached thereto outwardly and upwardly with respect to the air cylinder 54. This movement forces the matrix section 25 in a counterclockwise direction and breaks the inner surface thereof away from the cured tire.

The air valve 56 is then manipulated to draw the piston rod 55 away from the opening pin of the matrix section 25 after which this procedure is once again repeated with respect to the opening pin 28 of the matrix section 26 to break the tire T away therefrom.

Thereafter a tire breaking device or tire puller cable 90 comprising a length of steel cable having a loop 91 at each end thereof is fastened to a pair of tire breaking attaching devices 92 secured to the matrix section 26. When the tire breaking device 90 is in the position shown in FIG. 6, the air valve 56 is then actuated to extend the piston rod 55 and the pusher rod 85 attached thereto outwardly of the air cylinder 54. This movement of the piston rod 55 again pivots the movable matrix section and breaks the tire T away from the central matrix section 24 because of the attached tire breaking device 90. Thus, the tire may now be readily pulled out of the central matrix section 24 after the tire breaking device 90 is released and the matrix section 26 is pivoted about the associated hinge pin to a fully open position.

The mold 21 may now be removed from the loader 20 in the manner heretofore described, or a second tire may now be inserted in the central matrix section 24 and loading, curing and unloading operations may again be repeated.

While preferred forms and arrangements of parts have been shown in illustrating the invention, it is to be clearly understood that various changes in details and arrangement of parts may be made without departing from the spirit and scope of this disclosure.

I claim:

1. Apparatus for retreading tires comprising a support, means maintaining said support in elevated relationship to a supporting surface, an annular tire mold mounted on and supported by said support, said mold having an arcuate stationary mold section, arcuate wing sections pivotally connected to ends of said stationary section, a machine separate and apart from said tire mold for loading said mold including an elongated base normally positioned beneath said support and a lowermost exterior surface of said stationary mold section, said base having opposite ends projecting beyond said tire mold, means carried by said opposite ends of suspendingly supporting a force-applying member in overlying spaced relationship to said base and within the opening of the tire mold, and means for forcefully moving the force-applying member toward the base to set a tire within the underlying stationary mold section.

2. The mold loader as defined in claim 1 wherein means are provided apart from said moving means for selectively adjusting the distance of said force-applying member from said base.

3. The mold loader as defined in claim 1 including pivot means for pivotally securing said force-applying member to said supporting means.

4. A mold loader comprising a base adapted to be positioned beneath a generally annular-shaped tire mold, means carried by said base for suspendingly supporting a force-applying member in overlying spaced relationship to said base and within the opening of the tire mold, means for moving the force-applying member toward the base to set a tire within an underlying portion of the mold, and guide means carried by said base for slidingly engaging against guide surfaces of the mold for accurately positioning the base beneath the mold.

5. A mold loader comprising a base adapted to be positioned beneath a generally annular-shaped tire mold, means carried by said base for suspendingly supporting a force-applying member in overlying spaced relationship to said base and within the opening of the tire mold, means for moving the force-applying member toward the base to set a tire within an underlying portion of the mold, and latching means carried by said base for latchingly securing the base in underlying relationship to the tire mold.

6. The mold loaders as defined in claim 1 wherein said moving means is a fluid motor.

7. The mold loader as defined in claim 1 including pivot means for pivotally securing said supporting means to said base.

8. The mold loader as defined in claim 1 wherein said supporting means include a first arm, a second arm and a third arm connected between said first and second arms, and said force-applying member is carried by said third arm.

9. A mold loader comprising a base adapted to be positioned beneath a generally annular-shaped tire mold, means carried by said base for suspendingly supporting a force-applying member in overlying spaced relationship to said base and within the opening of the tire mold, means for moving the force-applying member toward the base to set a tire within an underlying portion of the mold, and said supporting means include a first arm, a second arm and a third arm connected between said first and second arms, said force-applying member is carried by said third arm, and one of said first and second arms is a fluid motor defining said moving means.

10. The mold loader as defined in claim 1 wherein said supporting means include a first arm, a second arm and a third arm connected between said first and second arms, said force-applying member is carried by said third arm, and means for adjustably securing said third arm to one of said first and second arms.

11. The mold loader as defined in claim 9 wherein said moving means is effective to decrease the length of at least one of said first and second arms to move said force-applying member toward said base.

12. The mold loader as defined in claim 2 wherein said adjusting means is a screw-thread connection between said force-applying member and said third arm.

13. The mold loader as defined in claim 2 including pivot means for pivotally securing said force-applying member to said supporting means.

14. The mold loader as defined in claim 4 wherein said guide means are defined by a pair of generally outwardly converging guide rails.

15. The mold loader as defined in claim 4 including latching means carried by said base for latchingly securing the base in underlying relationship to the line mold.

16. The mold loader as defined in claim 5 wherein said latching means is a latching arm pivotally connected to said base, biasing means normally urging said latching arm to the latched position thereof, cam means for engaging the mold and moving the latch arm against the force of said biasing means during the movement of the base beneath the mold, and a latch carried by said arm for engaging the mold under the influence of the biasing means upon proper positioning of the base beneath the mold.

17. The mold loader as defined in claim 8 including pivot means pivotally securing said force-applying member to said third arm.

18. The mold loader as defined in claim 8 wherein said moving means is a fluid motor defining one of said first and second arms.

19. The mold loader as defined in claim 17 including means for adjustably securing said third arm to one of said first and second arms.

20. The mold loader as defined in claim 18 wherein said fluid motor includes a piston rod, and means for adjustably securing said piston rod to one of said first and second arms.

References Cited
UNITED STATES PATENTS

| | | | |
|---|---|---|---|
| 2,456,063 | 12/1948 | James | 18—18F |
| 3,042,966 | 7/1962 | Laycox | 18—2TT |
| 3,315,412 | 4/1967 | Larson | 18—2TT |

ANDREW R. JUHASZ, Primary Examiner

L. GILDEN, Assistant Examiner

U.S. Cl. X.R.

18—2TP, 18F